United States Patent [19]

Stonier

[11] Patent Number: 4,913,302
[45] Date of Patent: Apr. 3, 1990

[54] FOLDABLE BOX FOR HANGING FILES

[76] Inventor: Russ W. Stonier, 1255 Sterling, Palatine, Ill. 60067

[21] Appl. No.: 200,658

[22] Filed: May 31, 1988

Related U.S. Application Data

[60] Continuation-in-part of Ser. No. 76,881, Jul. 23, 1987, Pat. No. 4,775,069, which is a division of Ser. No. 872,829, Jun. 11, 1986, Pat. No. 4,693,387.

[51] Int. Cl.⁴ .............................................. B65D 7/24
[52] U.S. Cl. ...................................... 220/6; 312/184
[58] Field of Search ............... 220/6, 4 F, 1.5; 16/29, 16/30, 45; 312/184

[56] References Cited

U.S. PATENT DOCUMENTS

| | | |
|---|---|---|
| 833,269 | 10/1906 | Weis . |
| 1,416,661 | 5/1922 | Barnhart . |
| 2,187,113 | 1/1940 | Ehrenzweig . |
| 3,372,829 | 3/1968 | Averill ................................. 220/6 |
| 3,456,994 | 7/1969 | Sullivan ............................. 312/184 |
| 3,527,339 | 9/1970 | Cipolla . |
| 3,682,522 | 8/1972 | Splan ................................. 312/184 |
| 3,796,342 | 3/1974 | Sanders et al. ..................... 220/7 X |
| 3,844,416 | 10/1974 | Potter . |
| 3,854,544 | 12/1974 | Kolcher . |
| 3,865,269 | 2/1975 | Coleman . |
| 3,938,870 | 2/1976 | Guest et al. . |
| 4,030,610 | 6/1977 | Alexander .......................... 211/182 |
| 4,071,258 | 1/1978 | Wallace ............................. 16/29 X |
| 4,213,225 | 7/1980 | Timmer . |
| 4,234,238 | 11/1980 | Figueroa . |
| 4,262,810 | 4/1981 | Ilich . |
| 4,505,388 | 3/1985 | Solomon ............................ 206/425 |
| 4,698,875 | 10/1987 | Kreeger ............................. 16/30 |
| 4,720,020 | 1/1988 | Su ..................................... 220/6 |

OTHER PUBLICATIONS

Tristar Industries, Big Folding Box.
Starplast, Square Folding Box.
Nighof, Multibox.

*Primary Examiner*—Steven M. Pollard
*Attorney, Agent, or Firm*—Laff, Whitesel, Conte & Saret

[57] ABSTRACT

A folding plastic box has two spaced parallel rails for supporting hanging files. Casters may be attached to the bottom of the box by plastic fasteners. The casters have base plates which fit fairly snuggly into the bottom areas of box-like cells formed on the bottom of the box. Plastic fasteners retain the casters in position. The walls of the box-like cells prevent lateral displacement of the casters. Also, the boxes may be transported on a dolly which has the casters attached to the bottom thereof.

6 Claims, 7 Drawing Sheets

FOLDABLE BOX FOR HANGING FILES

This a continuation-in-part of Ser. No. 07/076881, filed July 23, 1987, now U.S. Pat. No. 4,775,069, which, in turn, is a division of Ser. No. 06/872,829, filed June 11, 1986, now U.S. Pat. No. 4,693,387.

This invention relates to file boxes, and more particularly to foldable or collapsible file boxes with a rolling support and having side rails for supporting hanging files.

File boxes that can be compactly collapsed when empty, but which open to full storage size for use, offer convenience to both suppliers and users of such boxes. These boxes save storage space and are easier and less bulky to ship and move. However, many collapsible file boxes, for example those made of cardboard, are not very rugged and are inconvenient to use with hanging files.

In hanging file folder systems, the folders are suspended from spaced parallel rails in the file box rather than resting on the bottom of the box. The hanging folder system has an advantage over conventional files because, with the touch of a finger, the folders glide along the rails. Heretofore, it has been difficult to combine the benefits of a foldable file box with a hanging file folder system because the latter requires that the horizontal file supporting rails be somehow incorporated into the file box, which can interfere with a folding and stacking of the file boxes. For example, some companies sell bulky metal frames incorporating the hanging file rails that must be separately purchased, assembled, and placed in the file box. Other companies offer file rails that are attached to the top rim of the file box, where they are exposed to potential damage and may interfere with a nesting of a stack of such file boxes.

Accordingly, an object of this invention is to provide a new and improved folding file box for hanging files. another object is to provide a simple and inexpensive folding file box that easily stacks by nesting in a similar file box, even when hanging files are installed within the box. Yet another object is to provide a folding file box that also stacks when the files are removed and the box is collapsed, without removing the file rails.

A further object of this invention is to provide an easy way to fit such a file box with supports, such as casters or rollers to facilitate a movement of the file box both when full of files and when empty and collapsed. Another object is to facilitate the moving of many such file boxes at one time by providing a dolly adapted for use with them. Here, an object is to provide a number of alternative means for and methods of attaching casters or rollers to the box.

In keeping with one aspect of this invention, a foldable file box has spaced parallel file rails which are removable inserted into the box. The file box has a bottom panel, a generally rectangular top channel frame, and an inwardly collapsible side panel for each side. Along the top, the side panels are rotatably joined to a respective side channel of the top frame. The side panels are rotatably joined to a respective side of the bottom panel. At each end of the box, an end panel is rotatably joined at its top to a corresponding end piece of the top frame. When the end panel is swung down to a vertical position, it cooperates with the bottom panel and the collapsible side panels to lock the box in an open condition. Opposed pairs of rail sockets are provided adjacent the top portion of the box into which the rails can be inserted.

The file rails are vertically recessed so that several such file boxes, whether open or folded, can be stacked by nesting. There are also embodiments which permit an empty file box to be collapsed without a removal of the file rails. For portability, various rolling supports, such as easily attachable rollers or a dolly, may be adapted to easily fit on the file box bottom. The dolly may be sufficiently wide to simultaneously receive several similar file boxes, in a side-by-side position.

The invention provides a number of alternative constructions for attaching casters or rollers to the bottom of the box or dolly. These constructions use a plastic fastener in the form of a post having barbs extending outwardly therefrom. The posts are pushed through mounting holes in a box or dolly. As it passes through the mounting hole, the barb is deflected inwardly. After the barb emerges from the hole, the memory of the plastic causes it to spring out to a capture position so that the post cannot be removed from the hole. In this manner a caster or roller may be attached to the bottom of a box. An important feature of the invention is that the bottom surface of the box has a molded honeycomb of cells. Each cell is a recess which exactly fits the base of a caster or roller. Thus, the cell walls provide lateral stabilization for the caster.

BRIEF DESCRIPTION OF THE DRAWINGS

Preferred embodiments of this invention will become more apparent, by a reference to the accompanying drawings, in which.

Figures 1, 2, 3, 4, 5, 6, 7:
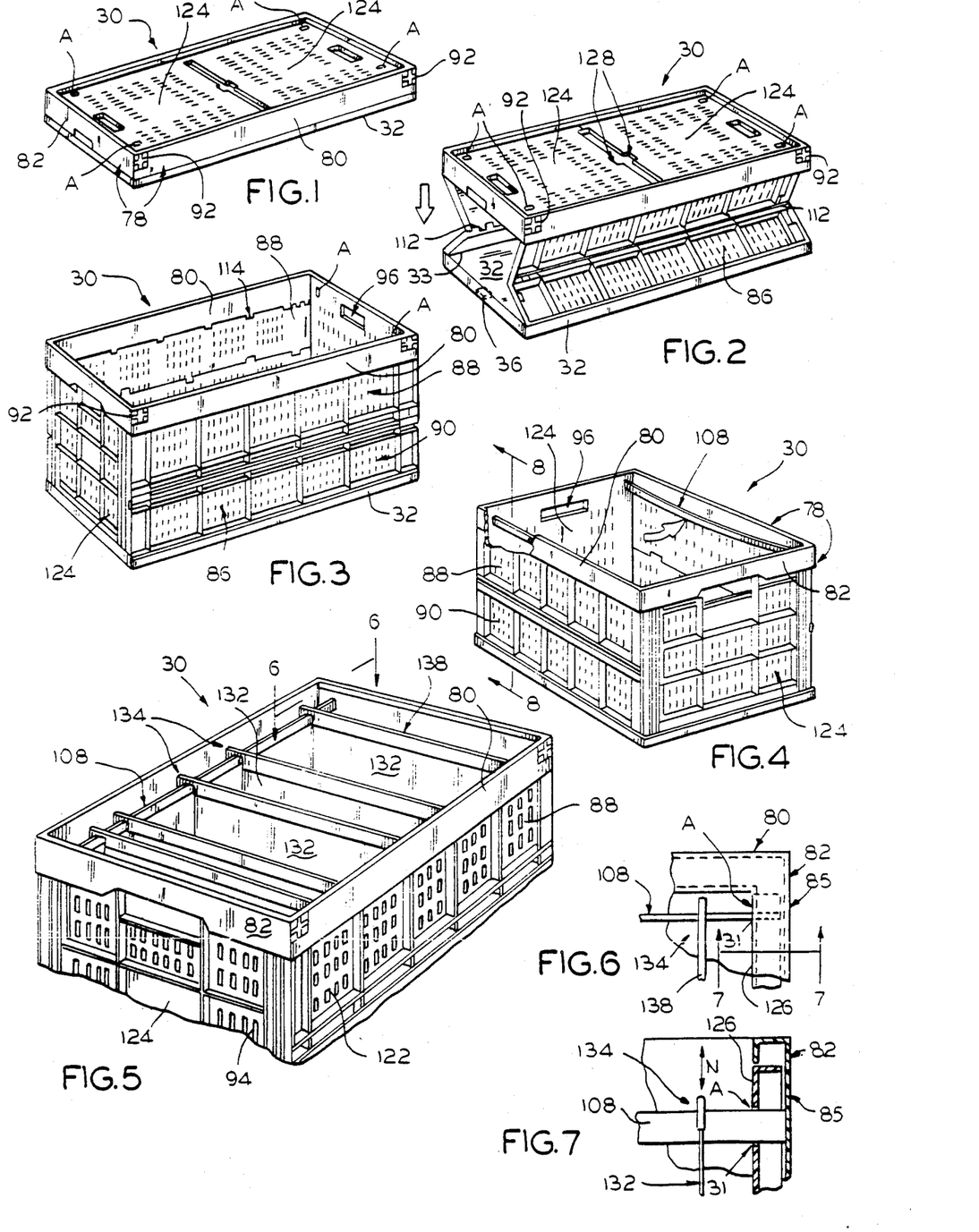
FIG. 1 is a perspective view of one embodiment of the invention, showing the box empty and collapsed with its file rails removed.
FIG. 2 is a perspective view of the embodiment of FIG. 1 in a partially opened condition.
FIG. 3 is a perspective view of the embodiment of FIG. 1 in a fully opened condition, ready to have the file rails installed.
FIG. 4 is a perspective view of the embodiment of FIG. 1 showing installation of a file rail by flexing or bowing the rail.
FIG. 5 is a partial perspective view showing the embodiment of FIG. 1 ready for use with the file rails and hanging file folders installed.
FIG. 6 is a fragmentary top plan view taken along 6—6 of FIG. 5.
FIG. 7 is a fragmentary cross section taken along 7—7 of FIG. 6.
Figure 8:
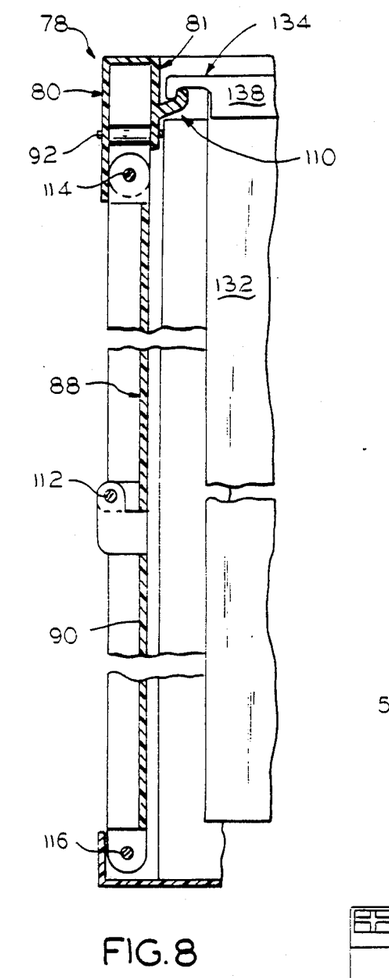
FIG. 8 is a partial transverse cross section of one side of a second embodiment of the invention in which a file rail is attached to or part of a side piece of the top frame.

As shown in FIGS. 1-3, a foldable file box 30 for hanging files includes a bottom panel 32, a generally rectangular top channel frame 78, and an inwardly collapsible side panel 86, composed of an upper side panel 88 and a lower side panel 90 joined by a middle hinge 112. The side panels 86 are rotatably joined at the top by a hinge 114 to a respective sidechannel or side piece 80 of the top frame, and also rotatably joined along the bottom to a respective side edge 33 of the bottom panel. An end panel 124 at each end of the box 30 is rotatably joined by an end panel hinge 92 to a corresponding end piece 82 of the top frame 78 and cooperates, when swung down to a vertical position, with the bottom panel 32 and the collapsible side panels 86 to lock open the box 30 for use. For ruggedness, such a box may be made of a durable material, such as molded plastic. To avoid inadvertent collapse, an additional locking means, shown generally as a locking member 36 on the bottom panel 32, cooperates with the bottom edge 128 of the end panel 124.

Examples of this general type of box are "MULTI/-BOX" by Nijohof Luxe Metaalwaren by of Zevenaar, Holland, and "STARPLAST" which is made in Israel but distributed in the U.S.A. by Tristar Industries of Paterson, N.J. The folding box is shown in U.S. Pat. No. 3,796,342.

As shown in FIG. 1, when folded or collapsed the box 30 occupies only a fraction of the space of the fully opened box, which is a very useful advantage.

FIGS. 4-7 show the box 30 with a pair of rails 108 for supporting hanging file folders 132. The file rails 108 are maintained in a spaced parallel relationship by opposed rail socket means, such as rail sockets A (FIGS. 6 and 7) adjacent the top portion of the box 30. In one embodiment, the resilient file rails 108 are inserted into the sockets A by bowing or flexing during insertion, as shown in FIG. 4. In other embodiments, the rails may be inserted from the ends or dropped in from the top. Still other techniques may be used; however, it is important that the rails do not move laterally far enough to drop out of their sockets.

While the file rails can be made of any suitable material, a flattened steel wire or bar stock which is about $\frac{3}{8}$ inch wide and about 1/16 inch thick works well, especially if the edges are rounded to reduce friction when the files are slid on the wire or edge. The wire ends are deburred for safety.

The top plan view showing a fragment of a corner (FIG. 6) and the cross section of FIG. 7 show how an orifice or aperture 31 is matched to the transverse cross section (illustratively rectangular) of the file rail 108. Conveniently, aperture 31 forms a suitable socket A near the top 126 of the inner face of end panel 124. Preferably, the socket's interior end may be closed off by the outer face 85 of the frame end piece 82 when the end panel 124 is in its vertical (opened) position. However, there may also be an opening in face 85 through which the rail 108 may slide, after which, it may drop into a socket, such as 31.

In FIG. 5, the file box is shown in use with hanging file folders 132 each having a file folder bar 138 with an endhook 134 at each end, supported by one of the file rails 108. As shown in FIG. 7, this construction provides a sufficient vertical recessing N to enable a stacking of a similar box, or an insertion of a cover, with a nesting protrusion (see protrusion 130a of FIG. 13), even with the hanging files in place.

Figure 9:
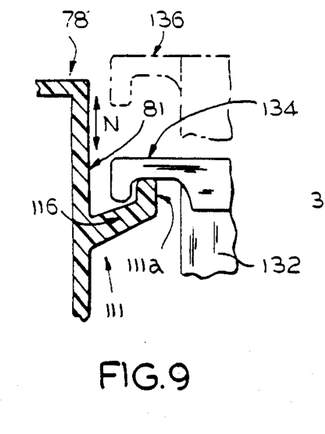
FIG. 9 is a fragmentary enlarged view of the transverse cross section of FIG. 8 showing the relationship between a hanging file folder end hook and the integral rail which supports it.
Figure 10:
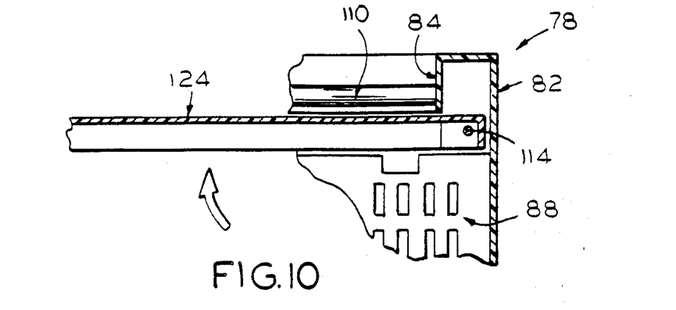
FIG. 10 is a fragmentary longitudinal cross section of one end of the embodiment of FIG. 8 showing the relationship of a raised end panel to the attached file rail.
Figure 20:
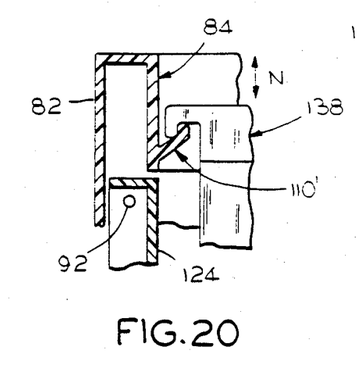
FIG. 20 is an enlarged fragmentary longitudinal cross section of a fourth embodiment of the invention in which the file rails are molded on the sides or the end pieces of the top frame.

A second embodiment of the foldable file box of the invention is shown in FIGS. 8, 9, 10, 13 and 14 wherein the file rails 110 may be an integral part of the top channel frame 78, for example, molded on the inner face 81 of a side piece 80. The integral file rails may also be attached on the inner face of an end piece 82 of the top channel frame 78, as shown in FIG. 20. Note that the integral rail embodiments can also be recessed by a distance N, as shown in FIGS. 9 and 20, to provide for nesting and stacking of the file boxes. FIG. 9 shows in cross section a preferred shape 111 of an integral rail, having an arm portion 111b supporting a finger portion 111a, these two portions being shaped to smoothly accommodate the various conventional end hooks 134, 136 found on the hanging file folders 132 of different makers.

Figure 11:
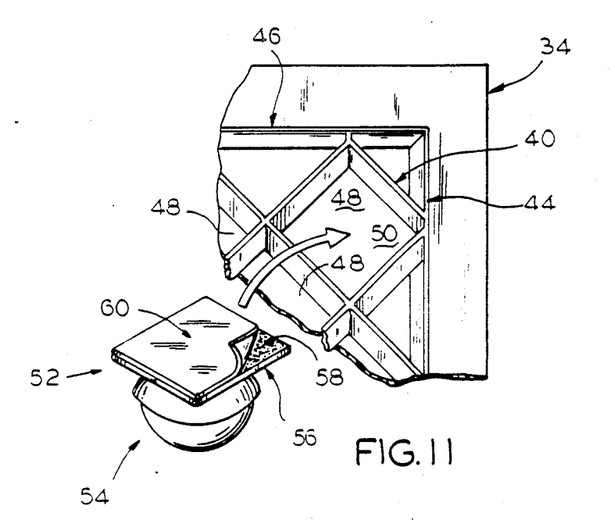
FIG. 11 is a perspective view of the bottom face on a bottom panel of a file box, showing its relationship to a roller that can be attached to it.
Figure 12:
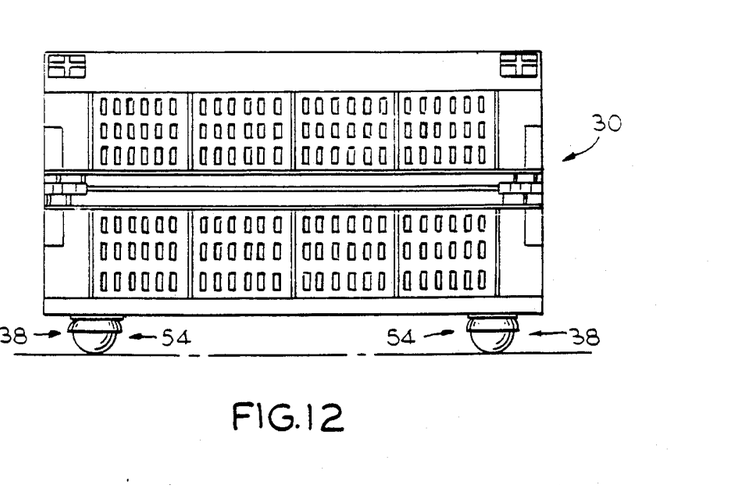
FIG. 12 is a side elevation of a file box having rollers on its bottom surface.

FIG. 11 shows one convenient way to attach a caster 54 or other roller means to the bottom face 34 of the bottom panel 32 of the file box, by taking advantage of a honeycomb-like protrusion 46 which is provided to strengthen the bottom panel 32. Such a honeycomb forms cells 48, selected ones of which can be used to receive a baseplate 60 of the cater 54, which can be affixed thereto by means of an adhesive layer 58 on the baseplate. The adhesive is protected by a release paper 60 until use. The base plate 56 fits closely within the molded cell 48 to provide lateral stability for the caster or roller 54. The resulting portable file box is shown in FIG. 12.

Figure 13:
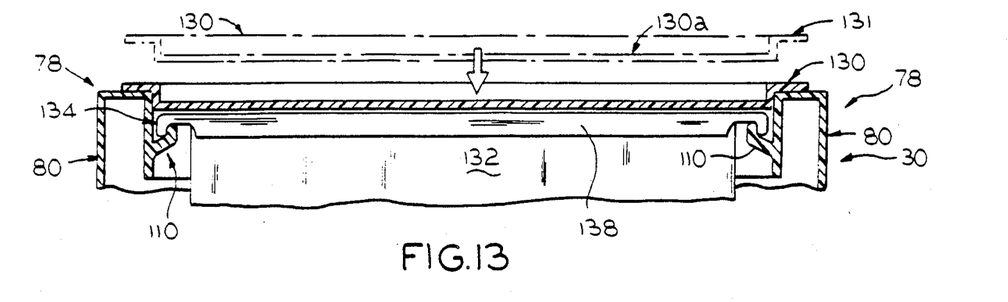
FIG. 13 is a fragmentary transverse cross section of the second embodiment showing how a cover may be nested into the top of the file box.
Figure 14:
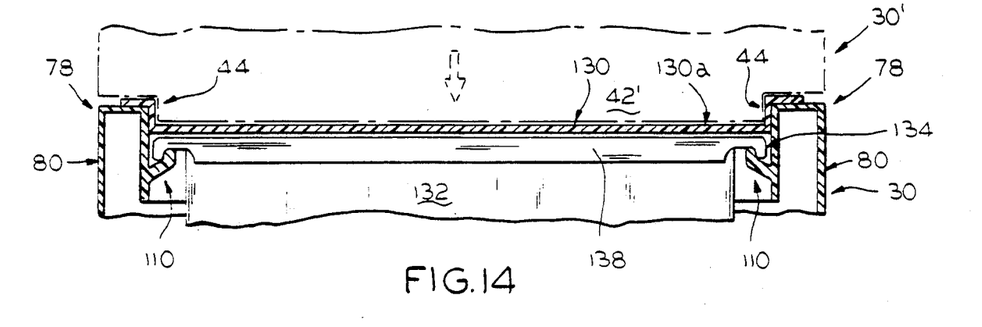
FIG. 14 is a fragmentary transverse cross section of the second embodiment showing another box nested into the covered file box.

FIGS. 13 and 14 show how easy it is, with the inventive construction, to also nest a cover 130 (shown in phantom lines 131) into file box 30. To faclitate nesting, the cover 130 preferably has a suitable protrusion 130a fitting in the top of box 30. Another and similar file box 30, having bottom protrusion 42, may be nested in place of cover 130 in the top of an underlying box top (FIG. 16); or if desired, the other box 30' may be nested in cover 130 (FIG. 14).

Figure 15:
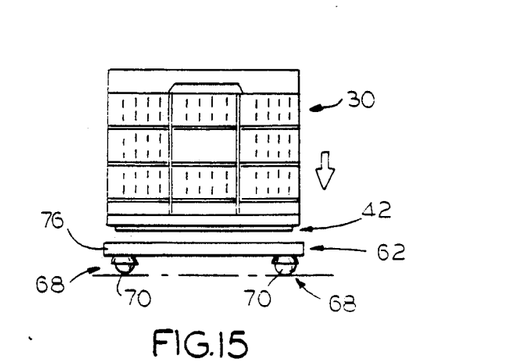
FIG. 15 is an end elevation of a file box according to the invention, in the process of being nested onto a dolly adapted to carry the file box.
Figure 16:
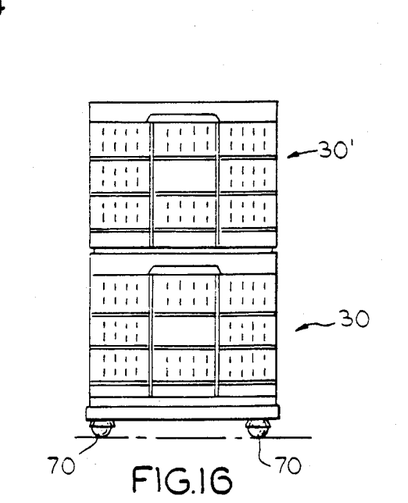
FIG. 16 is an end elevation of the file box of FIG. 15, fully loaded on the dolly with a second and similar file box nested on top of the first box.
Figure 17:
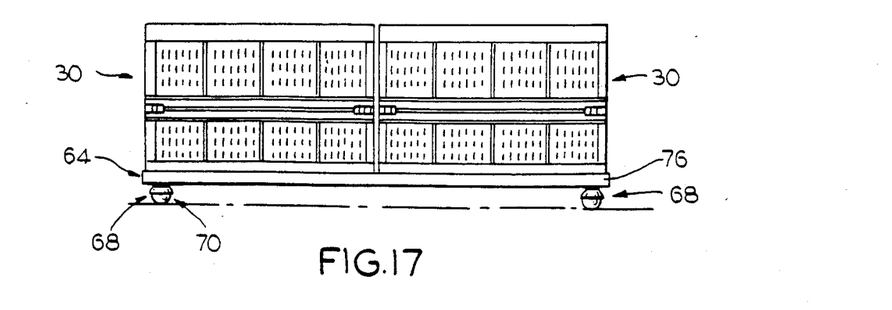
FIG. 17 is a side elevation of another dolly, according to the invention, the dolly being large enough to carry two file boxes stacked end-to-end.

A dolly 62 may also be provided, as shown in FIGS. 15 and 16, for accommodating a single file box. Dolly 64 shown in FIG. 17 is long enough to accommodate several boxes sitting in a row.

Figure 18:
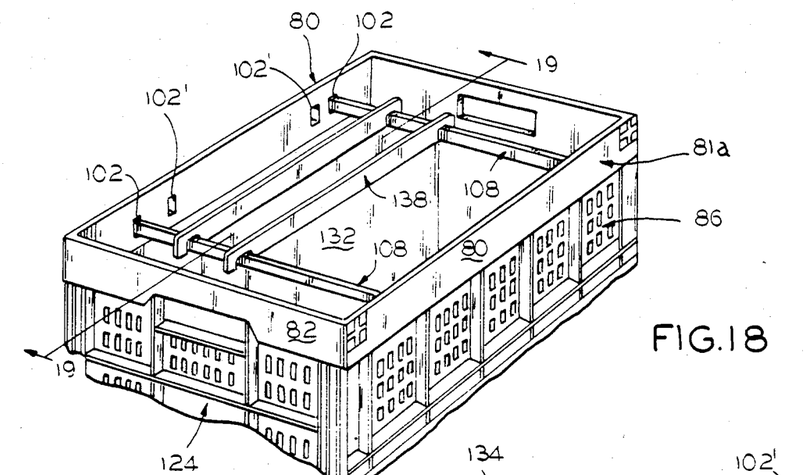
FIG. 18 is a fragmentary perspective view of a third embodiment of the file box in which file rails are inserted into sockets in the frame side pieces of the file box.
Figure 19:
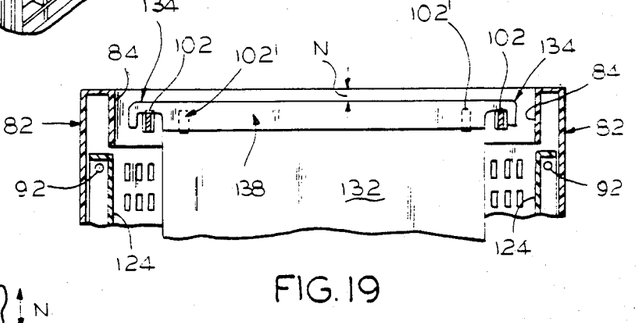
FIG. 19 is a fragmentary longitudinal section along lines 19—19 of FIG. 18.

FIG. 18-20 show an alternative embodiment of the invention where the rails extend transversely and across the width of the box. This embodiment is particularly useful to file longer paper, such as legal documents, maps, or the like.

A series of apertures 102, 102' are formed along the inner face 81 of frame side piece 80 to provide the socket means for receiving the ends of the rails. These apertures may be selected on a basis of the length of the paper to be filed. For example, thirteen inch paper may use file folders 132 which fit over rails inserted in apertures 102'. Fourteen inch paper may use file folders 132 which fit oVer rails inserted into apertures 102. In a similar manner, it may be convenient to use one of the apertures 102 and one of the apertures 102', in order to fit and support some other size of file folder. While the sockets are preferably formed along the inner face 81 of the frame side piece 80, if desired they could instead be incorporated into the inner face of the upper side panel 88.

FIG. 19 is a side elevation taken along line 19—19 of FIG. 18 to show how the file folders are recessed a distance N below the top edge 105 of the box. This recessing provides means for stacking boxes by enabling the bottom of an upper box to fit down into and sit upon the top of a lower box.

FIG. 20 illustrates a rail 110' which is integrally molded along the inner face 84 of one of the frame end pieces 82 to reduce the cost of manufacture and labor, which is otherwise required to make and insert the metal rails. Except for being on the frame end piece instead of the frame side piece, this feature is essentially the same as the feature shown in FIG. 9. Again, the hanger 138 is a distance N below the top edge 105, so that the boxes may be stacked.

Figure 21:
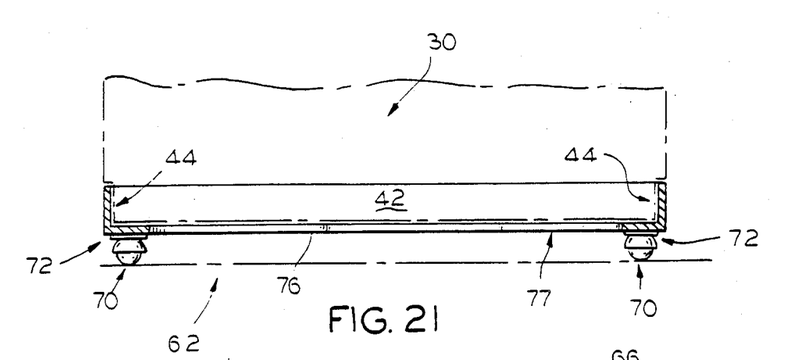
FIG. 21 is a partial transverse cross section showing a file box nested in a recess of a third dolly.
Figure 22:
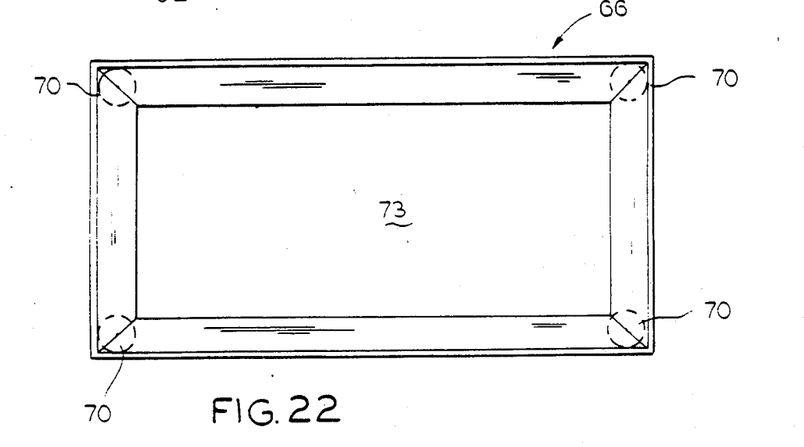
FIG. 22 is a top plan view of a fourth dolly constructed as an open frame.
Figure 23:
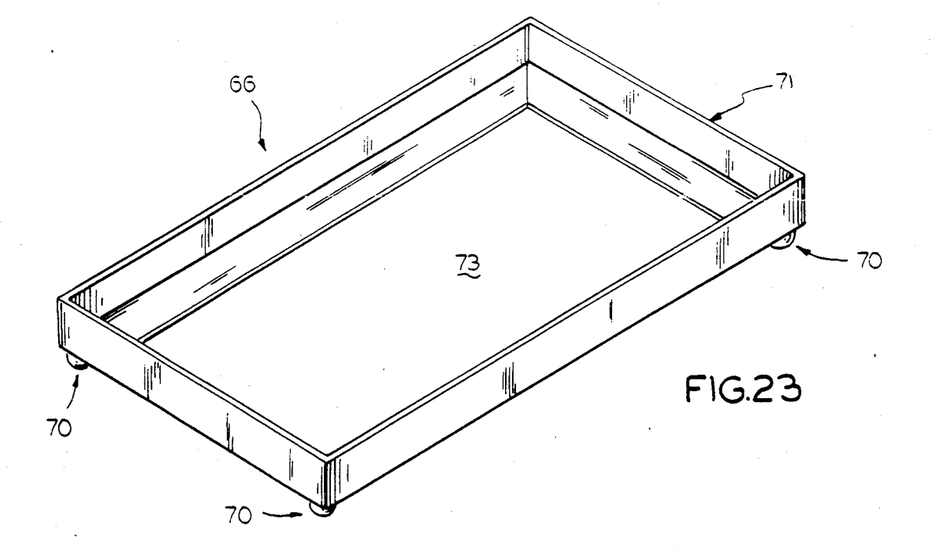
FIG. 23 is a perspective view of the dolly of FIG. 22.

FIG. 21 hows a suitable construction for the dolly's support base 76 having a recess 77 to provide for nestingly receiving a bottom projection 42 of the file box which is placed directly on the dolly. FIGS. 22 and 23 show an alternative open frame dolly 66, which is made of angle irons 71 formed into a rectangle with attached roller feet or casters 70. The open area 73 of the frame is a suitable recess to accommodate the bottom protrusion 42 of the box bottom.

Other means for attaching casters are shown in FIGS. 24–34. Again, the base plate of the caster exactly fits within a molded cell of the honeycomb structure on the bottom of the box in order to provide lateral stability.

Two fasteners of conventional design are shown in FIGS. 26, 27, 28, 32. In each case, a molded plastic (such as nylon, for example) fastener is used to attach the caster or roller to the bottom of the box. The fastener of FIGS. 26, 32 include a head 200, a shank 202, and a pair of barbs 204, 206. The shank 202 is split at 208 so that barb 206 may be pressed in toward barb 204 far enough to pass through a mounting hole 210. The tip 212 of the fastener is of a reduced cross section to facilitate an alignment of the parts and the penetration of the hole 210. After the barb 206 passes through the mounting hole, the memory of the plastic causes it to spring out and into a position to capture the fastener under the caster plate.

Figures 31, 32, 33:
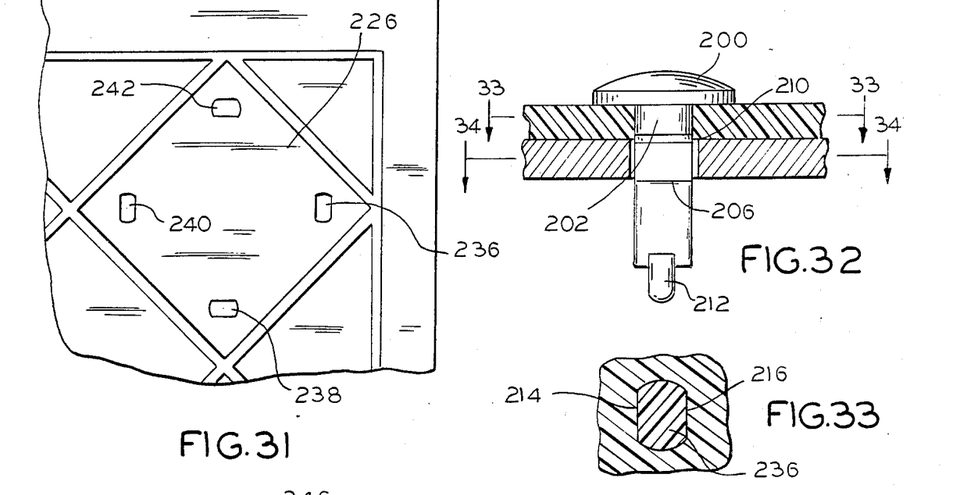
FIG. 31 shows a dolly with means for attaching a roller or caster to a dolly.
FIG. 32 is a side elevation taken along line 31-32 of FIG. 26.
FIG. 33 is a cross section taken along line 33—33 of FIG. 32.
Figure 34:
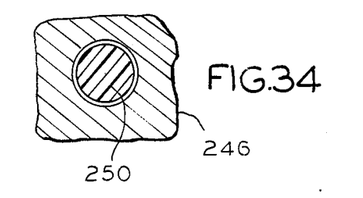
FIG. 34 is a cross section taken along line 34—34 of FIG. 32.

As shown in FIG. 33, adjacent the head 200, the cross section of the fastener shank 202 has two flat sides 214, 216 to preclude a rotation of the fastener. The area below the flat side has a circular cross section, as shown in FIG. 34.

Figures 24, 25:
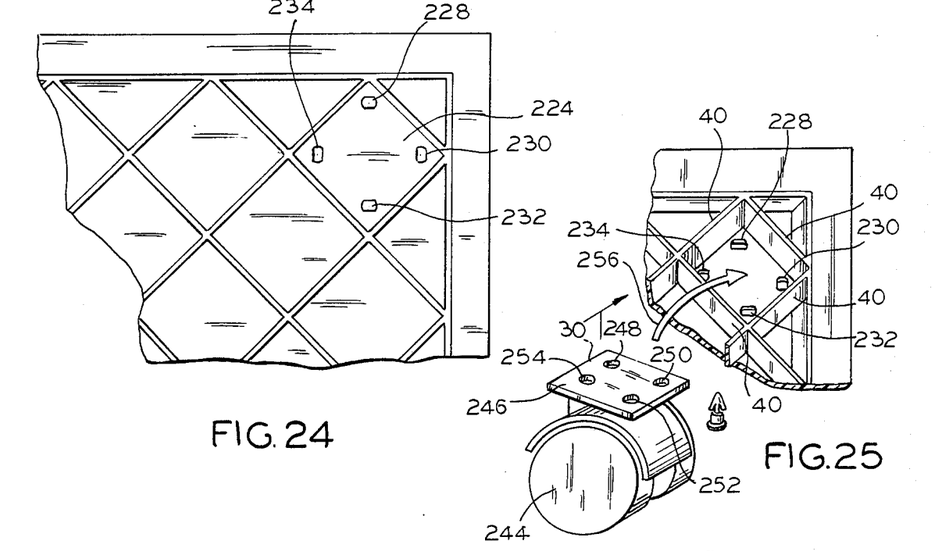
FIG. 24 is a plan view showing the underside of a box.
FIG. 25 is a fragmentary perspective view showing a roller or caster which is about to be installed on the box or dolly of FIG. 24.

The cellular structure, similar to FIG. 11, appears at 224 in FIG. 24 and at 226 in FIG. 31. Near each of the four corners of the cell, the floor of the cell has four holes 228–234 (FIG. 24) or 236–242 (FIG. 31).

Figures 26, 27, 28, 29, 30:
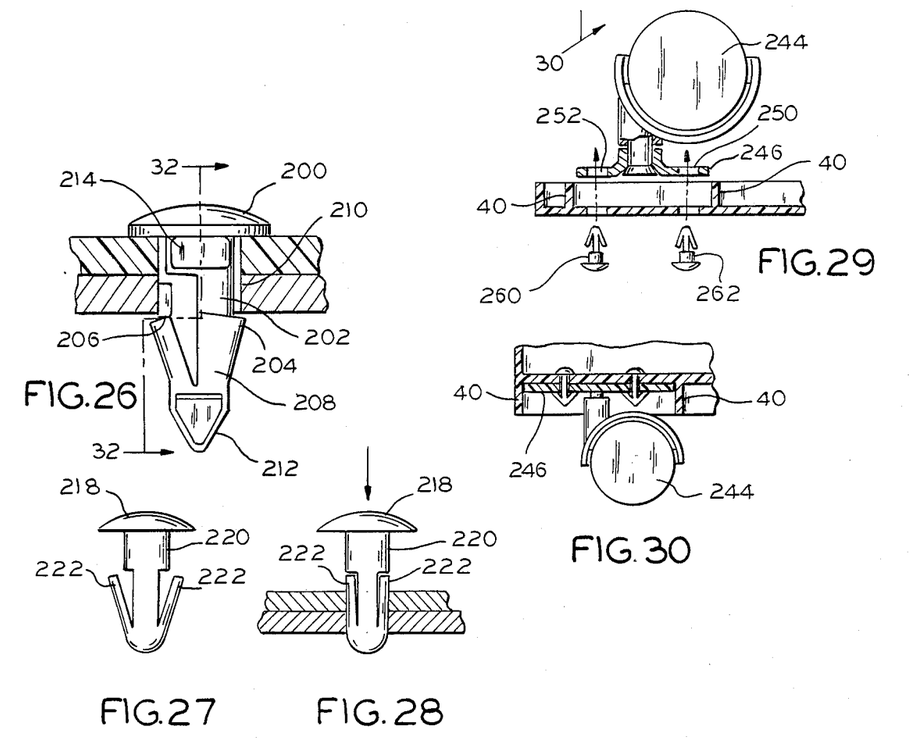
FIG. 26 is a cross-section showing a fragment of the box or dolly with a first type of plastic fastener in place.
FIG. 27 is a side elevation of a second type of plastic fastener used to attach a caster or roller to a box or dolly.
FIG. 28 is a similar side view of the fastener of FIG. 27 as it is being inserted into position.
FIG. 29 is a partial cross section of an inverted box with a roller or caster, which is about to be installed.
FIG. 30 is an upright side elevation of a fastener used to attach the roller.

The coaster or roller 244 (FIGS. 25, 29, 30, 35) has a flat base plate 246 with four mounting holes 248–252 therein. The mounting holes 248–252 align with the holes 228–230 (FIG. 24) or 236–242 (FIG. 31) when the roller is in place. Thus, as indicated by the arrow 256, the base plate 246 on the caster or roller 344 is placed on the surface within the cell and with the holes 228–234 and 248–254 aligned (FIG. 29). Then fasteners of FIGS. 26, 32 or FIGS. 27, 28 are passed through the aligned holes to secure the caster in the vertical direction. The cell walls 40 secure the caster in the lateral direction.

Figure 35:
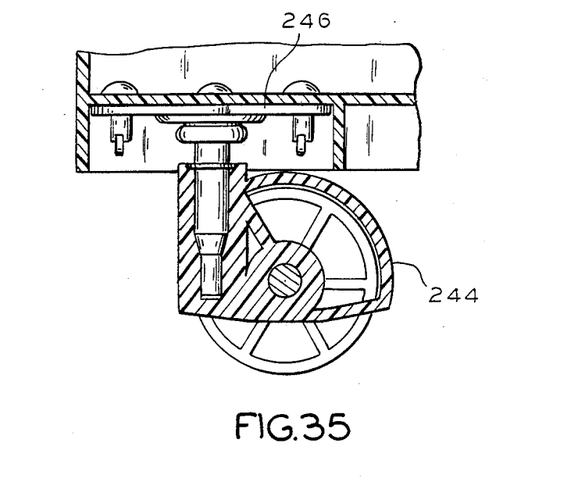
FIG. 35 shows a roller or caster installed according to the teachings of FIGS. 31-34.

When the fastener of FIGS. 26 and 32, are used, the flat sides 214, 216 are oriented to pass through the flat sided holes 236–242 in the box while the barbed end 204, 206 passes through the circular hole 250 in the plate 246. The barb spreads into a captive position after it emerges from beneath the plate 246. FIG. 35 shows the caster or roller 244 held in place by the fasteners of FIGS. 26 and 32.

Those who are skilled in the art will readily perceive how to modify the invention. Therefore, the appended claims are to be construed to cover all equivalent structures which fall within the true scope and spirit of the invention.

I claim:

1. A collapsible box for holding hanging files, said box comprising:

four sides and a bottom panel interconnected to form a generally rectangular shape, a first two of said sides being hinged to fold onto the bottom panel to provide a compact structure form and to fold into an upright and erect box;

the other two of said sides being hinged to swing to a position parallel to said bottom panel when said box is in said compact structure form and to swing to a locking position when said box is in said erect form;

a pair of spaced parallel rail members in the box for supporting the files;

caster means attached to the bottom of said box by a plurality of plastic fastener means, said spaced parallel rails being integrally formed near the top of said box and on confronting inner surface of at least an opposed two of said four sides, said integrally formed rail members projecting into said box far enough to receive end hooks of file hangers, and at least two of said four sides being hinged sufficiently far below said projecting integrally formed rails so that the other two of said four sides may swing to said position parallel said bottom panel and remain below said projecting rails.

2. The box of claim 1 wherein said opposed two sides are longitudinal side panels of said box and the projecting integrally formed rail members extend along inner faces of said longitudinal sides panels.

3. The box of claim 1 wherein said opposed two sides are end panels of said box and the projecting integrally formed rail members extend along the inner faces of said end panels.

4. A folding plastic box for storing hanging files suspended by corner hooks, said box having a generally rectangular base with two opposing side panels hinged to opposite sides of said base, said side panels being further hinged in approximately their middles to fold along a line parallel to the opposite sides of said base, end panels pivotally connected at upper corners of said opposing side panels, said end panels swinging up on said pivots to enable the box to be moved to a compact condition or swing down to enable said box to be moved to an erect position, two spaced parallel side rails integrally formed on at least an opposed two of said panels, said rails being formed near the top of said box and on confronting surfaces of said opposed two panels, said integrally formed rail members projecting into said box far enough to receive said corner hooks of said hanging files, and the tops of the other two of said panels being sufficiently far below said projecting rails so that said other two sides may swing to said compact condition and to be parallel with said base and remain below said projecting rails when in said compact condition, said rails in said spaced parallel relationship being separated by a distance which supports the corner hooks of the hanging files.

5. The box of claim 4 wherein said opposed two panels are longitudinal side panels of said box and the integrally formed projecting rail members extend along and above inner faces of said longitudinal side panels.

6. The box of claim 4 wherein said opposed two panels are end panels of said box and the integrally formed projecting rail members extend along said end panels.

* * * * *